Oct. 25, 1966  O. L. LOOKER  3,280,977
HARVESTING CONVEYORS WITH ADJUSTABLE SLATS
Filed May 28, 1963  4 Sheets-Sheet 1
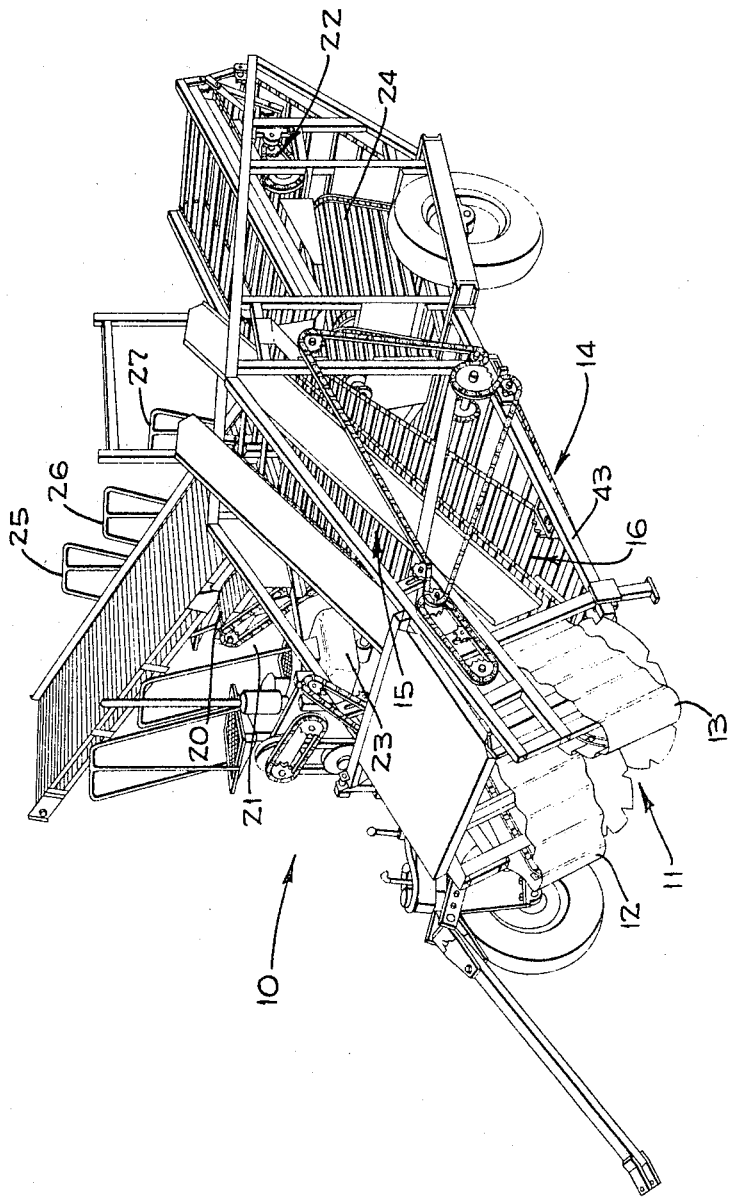
FIG_1
INVENTOR
OLIN L. LOOKER
BY Hans F. Hoffmeister
ATTORNEY

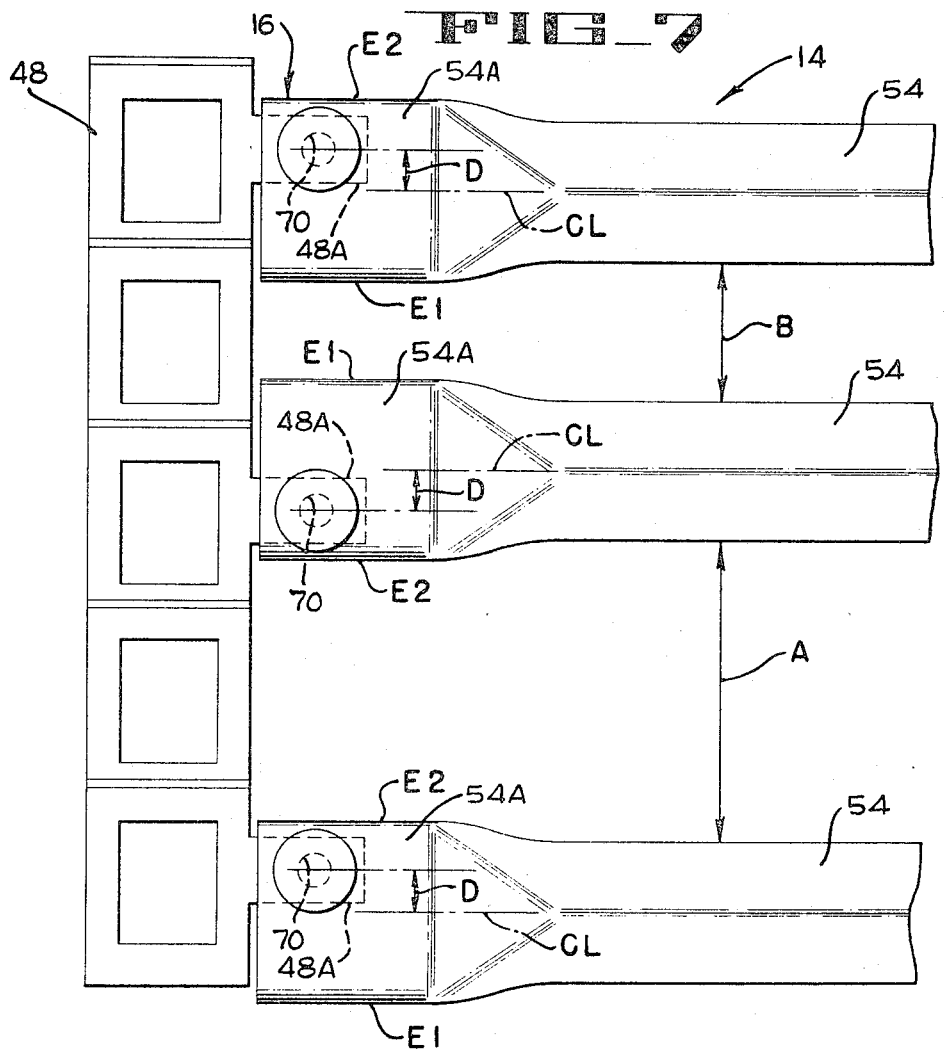
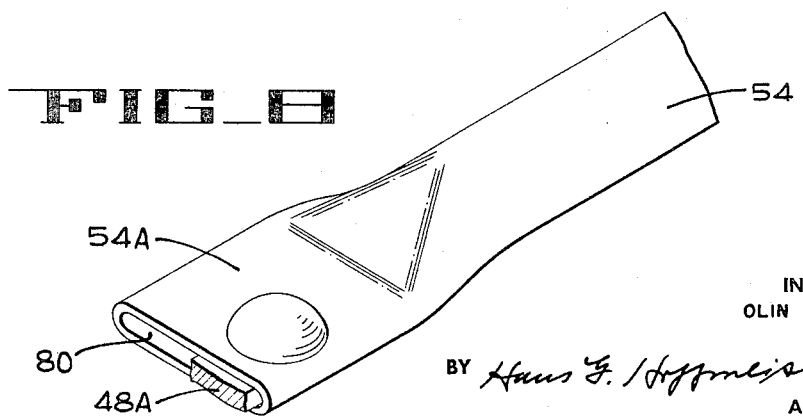

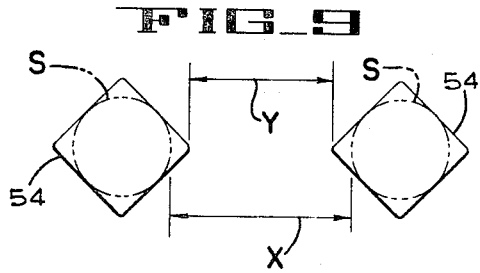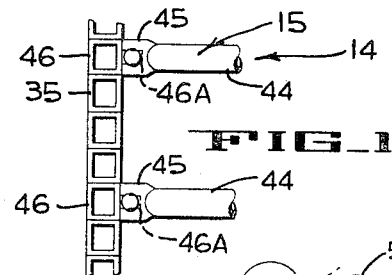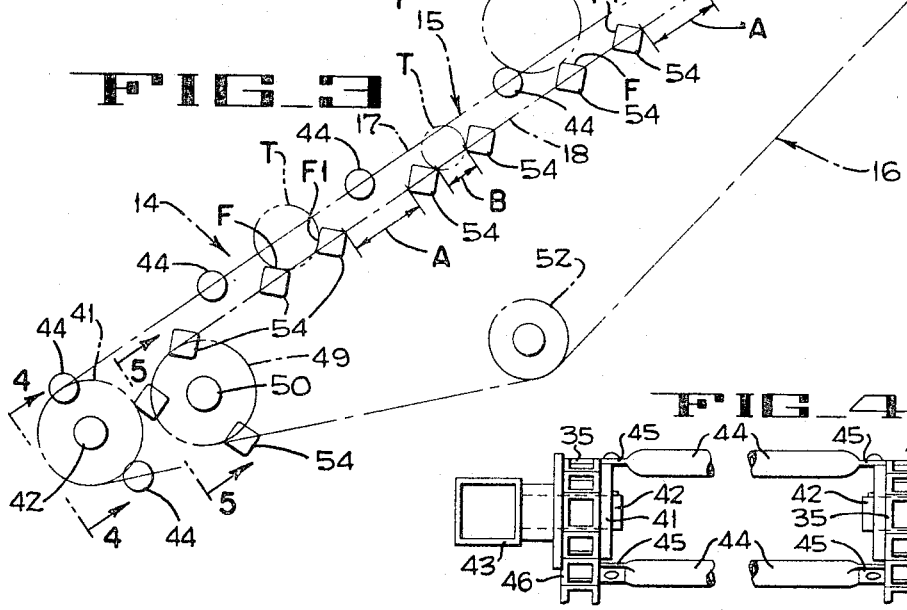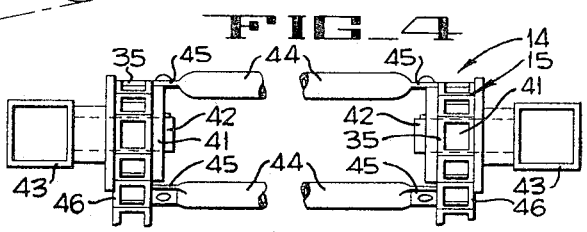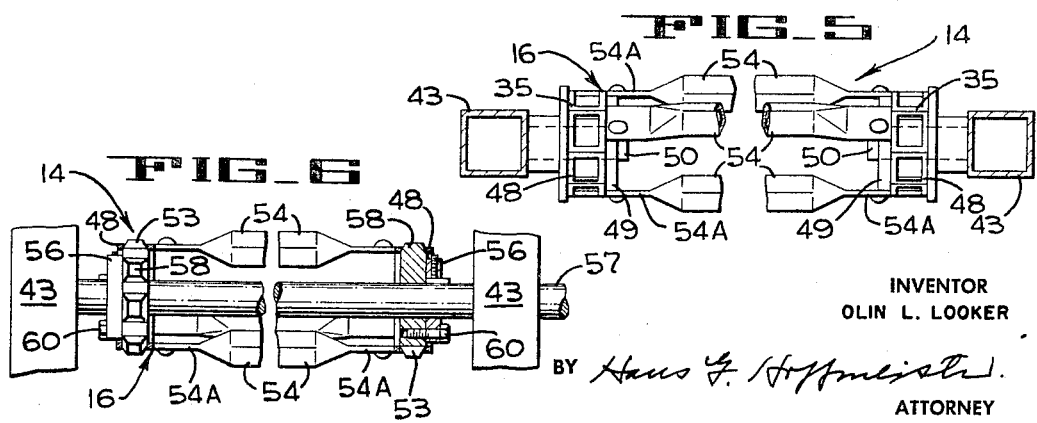

Oct. 25, 1966     O. L. LOOKER     3,280,977
HARVESTING CONVEYORS WITH ADJUSTABLE SLATS
Filed May 28, 1963     4 Sheets-Sheet 2
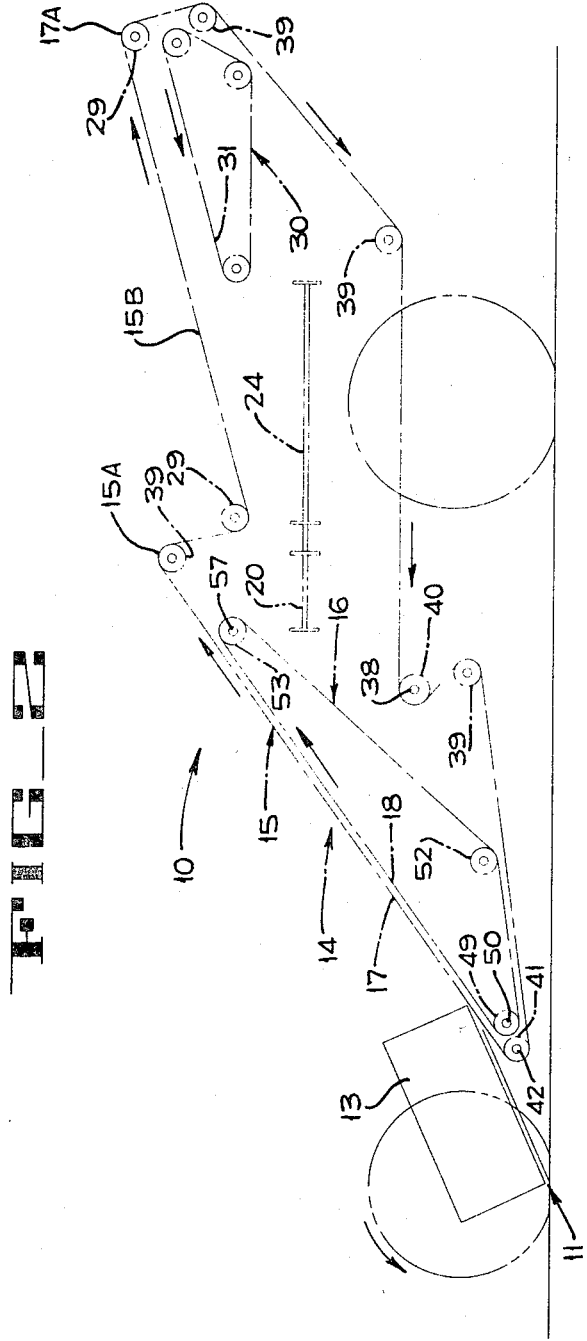
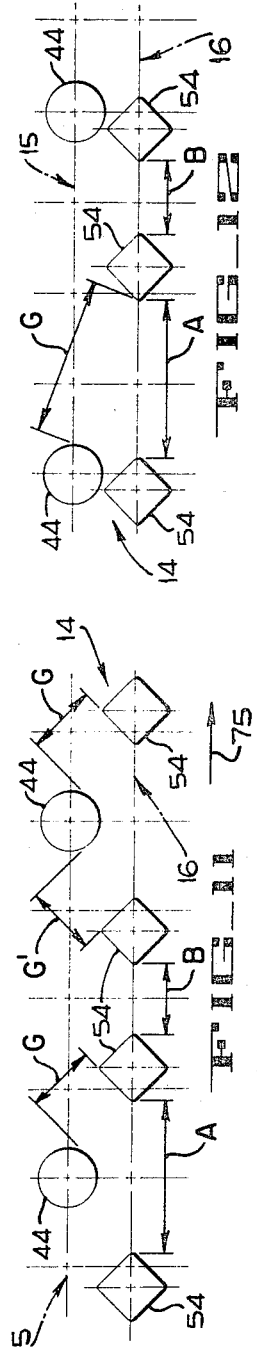
INVENTOR
OLIN L. LOOKER
BY Hans G. Hoffmeister
ATTORNEY

3,280,977
HARVESTING CONVEYORS WITH ADJUSTABLE SLATS
Olin L. Looker, Stockland, Ill., assignor to FMC Corporation, San Jose, Calif., a corporation of Delaware
Filed May 28, 1963, Ser. No. 283,916
10 Claims. (Cl. 209—307)

This invention pertains to machines for harvesting vine crops, such as tomatoes, and more particularly concerns an improved sorting conveyor for such harvesting machines.

In one type of tomato harvester, the vines are dug from the ground, and dirt, stones, loose tomatoes, and vines with tomatoes thereon are carried through the machine. At the entrance to the machine, a mechanism is employed to make a primary separation of dirt, stones and undersize tomatoes from the vines and the tomatoes of desirable size. This mechanism is in the form of two endless conveyors, an inclined portion of the upper run of one conveyor, known as the drop-away conveyor, being positioned below and closely adjacent the inclined upper run of the other conveyor which is referred to as the vine conveyor. Both conveyors are of the cross-slat type, with the distance between slats of the upper conveyor being about three times as great as the distance between the slats of the drop-away conveyor. Accordingly, the vines, dirt, stones and loose tomatoes are carried upwardly by the two conveyors with objects such as large dirt clods, stones, and loose tomatoes resting on the slats of the lower, drop-away conveyor and the vines resting on both conveyors. The spacing between adjacent slats of the drop-away conveyor is such that dirt, stones and undersize loose tomatoes drop through onto the ground while loose tomatoes of desirable size are carried to the end of the upper run of the drop-away conveyor where said upper run drops away from the vine conveyor to discharge the desirable tomatoes onto a suitable receptacle.

Since the spacing between the slats of the drop-away conveyor determines which tomatoes will be retained and which will be discarded and, since the size and shape of different types of tomatoes vary, it has been found that the use of a drop-away conveyor having slats that are capable of providing grading openings of only one size is not entirely satisfactory for use in harvesting different types of tomatoes.

Accordingly, it is an object of the present invention to provide a sorting mechanism for a vine-crop harvester that is capable of use with crops having different size fruit.

Another object is to provide a sorting conveyor that is adjustable to vary the grading openings of the conveyor.

Another object is to provide a sorting conveyor for a harvester that is easily serviced in the field.

Another object is to provide an inclined sorting conveyor capable of retaining certain desirable articles on the inclined surface in relatively stable condition while undesirable objects are discarded.

Another object is to provide an improved conveyor of the cross-slat type.

It is another object of the present invention to provide a vine conveyor having transverse members of different configuration from that of the drop-off conveyor thereby providing intervening spaces between the upper runs of these conveyors that is readily adaptable to the various sizes of tomatoes or fruit being harvested.

Other and further features and objects of the invention will be apparent from the following description taken in connection with the accompanying drawings in which:

FIGURE 1 is a perspective view of a vine harvesting machine having an improved primary sorting conveyor constructed in accordance with the teachings of the present innvention.

FIGURE 2 is a diagrammatic side elevation of the harvesting machine particularly showing the conveyor system of the machine.

FIGURE 3 is an enlarged schematic section of a part of the improved sorting conveyor used in the harvester shown in FIGURE 1.

FIGURE 4 is a front elevation partly broken away, looking in the direction of line 4—4 of FIG. 3.

FIGURE 5 is a fragmentary section taken along line 5—5 of FIG. 3.

FIGURE 6 is a fragmentary elevation of the upper end of the conveyor of FIG. 3, certain parts being shown in a section.

FIGURE 7 is an enlarged fragmentary plan, particularly illustrating the attachment of the transverse members of the conveyor to the driving chains.

FIGURE 8 is a perspective on an enlarged scale further illustrating the connection of the cross-slats of the conveyor to the chain.

FIGURE 9 is a diagrammatic section on an enlarged scale of conveying surfaces shown in FIG. 3.

FIGURE 10 is a fragmentary diagrammatic view showing the manner in which the slats of the vine conveyor are connected to the chains.

FIGURES 11 and 12 are diagrammatic showings of two different adjusted positions of the conveyor chains.

The transverse members of the drop-away conveyor of the present invention are improvements over the transverse members disclosed in the pending U.S. application for patent of Olin L. Looker, Serial No. 127,199, filed July 27, 1961, said pending application being assigned to the assignee of the present invention. These improved transverse members are of different geometrical configuration than the transverse members shown in said application and each improved transverse member has been modified in a manner and for a purpose which will be explained presently. It will be understood that the manner in which the transverse members are mounted in the drop-away conveyor of the machine, the manner in which they are driven by the machine, and all other aspects of the operative connections of the transverse members in the machine and the manner in which the conveyors are driven are identical to those disclosed in said pending Looker application, and reference to said application may be had for details of construction and operation that are not specifically described hereinafter.

The embodiment 10 of the tomato harvester chosen to illustrate the present invention includes, in general, a disc-type vine severing and conveying mechanism 11 (FIG. 1) which is arranged to cut into the ground to sever the roots of the vine and remove a layer of dirt, tomatoes and vines from the ground, and a pair of corrugated of fluted pick-up belts 12 and 13 which cooperate with the vine severing mechanism 11 to convey the tomatoes, dirt and vines rearwardly to the lower end of an endless, slat-type primary sorting and elevating conveyor 14. The primary sorting conveyor 14 (FIG. 2) includes two conveying members namely, an endless vine conveyor 15, extending the length of the machine 10 from the rearward end of the vine-severing and conveying mechanism 11 to the trailing end of the machine, and an endless drop-away conveyor 16 having its upper run 18 disposed beneath the upper run 17 of the vine conveyor 15. As the mass of vines, dirt and tomatoes are carried upwardly, the layer of dirt and loose ripe tomatoes tend to fall through the upper run 17 of the vine conveyor 15 but are prevented from dropping through by the upper run 18 (FIG. 3) of the endless drop-away conveyor 16. Dirt, gravel, small loose tomatoes, and small objects of the dirt layer, of course, fall through both conveying surfaces of the primary sorting conveyor 14 and are separated from the vines at this point. The dirt layer also includes dirt clods some of which fall through conveyor run 18 to the ground while other, larger dirt clods are retained on the upper surface of the conveyor run 18. When the upper end of the upper run 18 is reached, the retained dirt clods and loose tomatoes of commercial size that are being carried along by the drop-away conveyor 16, are dropped onto a lateral conveyor 20, which will be referred to hereinafter as the dirt conveyor, and which, as seen in FIGURE 1, carries the material laterally of the machine past an inspection station 21 where the loose tomatoes may be removed by one of two inspectors located at this point, and the dirt clods are permitted to be discharged over the end of the conveyor 20 onto the ground. Accordingly, the three conveyors 15, 16 and 20 are effective to first separate the debris and undesirably small loose tomatoes from the vines and commercial-size tomatoes, and then separate the retained dirt clods and loose commercial-size tomatoes from the mass of vines which, of course, have tomatoes thereon.

The vines with tomatoes clinging thereto continue moving upwardly to a peak portion 15A (FIG. 2) of the vine conveyor 15 and are dropped down onto a shaker section 15B of the vine conveyor 15. This shaker section 15B is continuously reciprocating back and forth in a direction longitudinally of the machine 10 by a drive mechanism 22 (FIG. 1) which is driven by an engine 23. The drive mechanism further includes oscillatable arms (not shown) which carry auxiliary sprockets 29 (FIG. 2) thereon. The reciprocating movement of the conveyor section 15B is such that the vines are bounced around haphazardly as they travel along. The agitation of the vines is of a sufficient intensity to snap the stems of the attached tomatoes, causing the previously attached tomatoes to fall away from the vines and drop between the bars of the vine conveyor 15 onto a second transverse conveyor 24, hereinafter referred to as the tomato discharge conveyor, which transports the tomatoes laterally past inspectors standing at inspection stations 25, 26 and 27 (FIG. 1). The inspectors remove green tomatoes and fragments of vines and permit the ripe tomatoes to be discharged into suitable receptacles for transporting to a cannery. Referring to FIG. 2, it will be noted that the tomato discharge conveyor 24 underlies only a portion of the shaker section 15B. Tomatoes that are not dropped directly onto the discharge conveyor 24 are dropped onto an auxiliary conveyor 30 which has an upper run 31 movable downwardly toward the discharge conveyor 24 to deliver tomatoes onto that conveyor. The depleted vines are carried upwardly over the end 17A of the upper run 17 of the conveyor 15 and discharged onto the ground behind the forwardly moving machine 10.

The vine conveyor 15 comprises a pair of spaced endless chains 35 (FIG. 4) each of which is trained around the previously mentioned sprockets 29 and around a plurality of idler sprockets 39 (FIG. 2), a guide roller 41, and a drive sprocket 40 that is keyed to a drive shaft 38.

Each guide roller 41 is rotatably journalled on a stub shaft 42 (FIG. 4) that is fixed to and projects outwardly from a fixed frame member 43. A plurality of tubular conveying slats 44 extend between and are secured to the chains 35, each slat being circular in cross-section and having a flattened end portion 45 (FIG. 10) secured, as by rivets, to an arm 46A projecting inwardly from special links 46 of the conveyor chains 35.

The drop-away conveyor 16 also comprises a pair of endless chains 48 (FIG. 5), each of which is trained around a guide roller 49, journalled on a stub shaft 50 fixed to one of the frame members 43, around an idler sprocket 52 (FIG. 2) and around a drive sprocket 53. A plurality of cross slats 54 (FIG. 5) are secured in position between the chain 48, each slat being rectangular in cross-section and having a flattened end portion 54A riveted to an arm of the associated chain 48.

Each drive sprocket 53 (FIG. 6) is a composite member consisting of a disc 56 that is keyed to a drive shaft 57 and a sprocket 58 that is rotatable on the shaft 57 and is arranged to be secured to the drive disc 56 by a capscrew 60 that extends through a slot 61 (FIG. 3) in the disc and is threaded into the sprocket. The capscrew connection of the two sprockets 58 to the adjacent discs 56 make it possible to adjust the position of the chains 48 relative to the shaft 57. The drive mechanism for the two conveyors 15 and 16 is shown and described fully in the above mentioned Looker application. For the purposes of the present invention, it is sufficient to understand that the two conveyor drive shafts 38 and 57 are driven in timed relation from a common drive chain. Accordingly, when the capscrews 60 are loosened and the sprockets 58 are rotated relative to shaft 57 to adjust the chains 48 and the slats 54 relative to drive shaft 57, the chains 48 and the slats are also being adjusted relative to drive shaft 38 and to the cross-slats 44 of the vine conveyor 15. The purpose of this adjustment will be explained presently.

It will be noted in FIG. 3 that the cross-slats 44 on the chains 35 of the vine conveyor 15 are spaced equidistantly, the equal spacing being obtained by using chain links having identical pitches (FIG. 10) and connecting each slat so that the axis of the tubular slat 44 is in a plane that bisects the associated link. The cross-slats 54 of the drop-away conveyor are not equally spaced but are so located that two sizes of grading openings are provided, that is, a large opening A and a smaller opening B. Referring to FIGS. 7 and 8, the two different sizes of openings are obtained by locating the rivet hole 70 in the slat 54 a predetermined distance D from the longitudinal centerline CL of the slat. Accordingly, the flat end of each slat 54 has a large area defined between the centerline of the rivet hole 70 and an edge E1, and a smaller area defined between the rivet hole 70 and an edge E2. The larger grading opening A is obtained between two adjacent slats by arranging them so that the edges E2 are opposite each other, while the smaller grading opening B is obtained by arranging the slats so that the edges E1 are opposite each other.

The advantage of this use of a drop-away conveyor having two grading openings may be seen in FIGS. 11 and 12. In FIG. 11 the slats 54 of the drop-away conveyor are so located relative to the slats 44 of the vine conveyor 15 that the small opening B is almost identical in size to the grade openings G and G' formed between the slanted walls of the slats 54 and the adjacent slats 44. Accordingly, tomatoes whose largest dimension is smaller than the openings B, G and G' will pass through these openings while larger tomatoes will be carried forwardly in the direction of arrow 75 toward the upper end of the drop-away conveyor. If a larger grading opening is desired, the capscrews 60 on the drive sprockets of the drop-away conveyor are loosened and the chains of the drop-away conveyor are advanced equal distances in the direction of arrow 75. It will be evident that as this adjustment is made each grading opening G is increased in width. At a point that is indicated diagrammatically in FIG. 12, the opening G becomes as large as opening A in the drop-away conveyor and, accordingly, such an opening is the largest grading opening that can be obtained. Accordingly, due to the offset relation of the rivet holes in the drop-away conveyor slats and, due to the fact that the chains of the drop-away conveyor can be adjusted relative to the chains of the vine conveyor, various grading openings can be obtained.

It will be evident that the slats 54 of the drop-away conveyor could be circular in cross-section and the variable grading openings could still be obtained.

The use of slats of square cross-section have a particular advantage in that, as seen in FIG. 3, tomatoes T become seated between the adjacent inclined faces F and F1 of the slats and are held in a relative stable condition so that they do not tend to roll back down the conveyor.

FIG. 8 is a detailed showing of how each slat 54 of the drop-away conveyor is connected to the associated conveyor chain. It will be noted that the flattened end 54a is not completely closed but is provided with an opening 80 into which the arm 48A of the conveyor chain link extends to receive the rivet. This connection results in a cross-slat conveyor structure that is simple, strong and relatively inexpensive.

Another advantage of the square tube arrangement is illustrated in FIG. 9. If the conveying surface of the drop-away conveyor 16 is formed of rounded tubes S of a certain diameter, shown in phantom lines, the spacing X between the confronting surfaces of the round tubes is greater than the spacing Y between confronting edges of adjacent square tubes of the same size. Accordingly, for any given spacing between tubes, a conveyor having square tubes would be more economical to produce since fewer tubes are necessary.

From the foregoing description it will be evident that the present invention provides a simple, effective sorting conveyor for a harvesting machine. The use of a drop-away conveyor that is adjustable relative to the vine conveyor and has two fixed grading openings provides a particularly efficient arrangement which makes possible a close control over the sizing of the fruit and makes possible adjustments designed to help the in-feed portion of the machine quickly clear itself of dirt.

As defined in the appended claims, the distance between successive slats of the upper and lower conveyors, or conveying surfaces, refers to the distance measured between lines tangent to the confronting surfaces of the slats and perpendicular to the path of conveying movement. In other words, the distance between successive slats is the grading opening formed by the cooperating slats of the upper flights of the upper and lower conveyors.

While particular embodiments of the present invention have been shown and described it will be understood that the primary sorting conveyor is capable of modification and variation without departing from the principles of the invention and that the scope of the invention should be limited only by the scope and proper interpretation of the claims appended thereto.

Having thus described my invention what I claim as new and desire to be protected by Letters Patent is:

1. A sorting mechanism comprising a first conveyor having a plurality of transverse slats providing an upper conveying surface, each slat being longitudinally spaced at equally predetermined distances from the adjacent slats on either side thereof, a second conveyor having transverse slats providing a lower conveying surface closely underlying said first conveying surface and cooperating therewith to support and advance articles, the slats of said second conveyor being arranged in pairs, the spacing between one slat of said second conveyor and its corresponding slat of either adjacent pair of slats being substantially equal to said predetermined distance, the confronting two slats of adjacent pairs of slats being spaced apart greater than the distance between the slats comprising each pair so as to provide two grading openings of different sizes for said second conveyor, and means for adjusting the conveying surface of said second conveyor as a unit relative to said upper conveying surface and in a direction generally longitudinally of said upper surface whereby variable-size grading openings, as measured between lines tangent to the confronting surfaces of successive slats and perpendicular to the path of conveying movement, are formed by the cooperating slats of the upper flights of the upper and lower conveyors.

2. In a conveying and sorting mechanism, a pair of conveyors movable in the same direction, the conveying surface of one of the conveyors closely overlying the conveying surface of the other and both including a plurality of slats disposed transversely of said direction of movement and having spaces therebetween, there being alternately large and small spaces between successive slats of the lowermost one of said conveying surfaces, all of the large spaces being equal and all of the small equal spaces being equal, said conveyors having a first sorting position with the distance between successive slats of both of said conveyors taken together being substantially uniform and equal to said small spaces, and a second sorting position with the maximum distance between successive slats of both of said conveyors taken together being equal to said large spaces, and means for adjusting the relative positions of said conveying surfaces along the path of conveying movement.

3. In a conveying and sorting mechanism, a lower conveyor including a plurality of pairs of substantially parallel slats movable along a lower path and being disposed transversely of said path with the slats of each pair equally and longitudinally spaced a first predetermined distance apart, the confronting slats of successive pairs of slats being spaced a second predetermined distance apart greater than said first distance, an upper conveyor including a plurality of upper slats overlying and substantially parallel to said lower slats, said conveyors having a first sorting position in which each pair of lower slats are spaced equidistantly between successive upper slats, and a second sorting position in which each pair of lower slats are displaced from said sorting positions, and means for adjusting the relative positions of said conveyors.

4. The mechanism of claim 3 wherein in said first sorting position the distance between successive upper and lower slats of both conveyors taken together is equal to said first distance.

5. The mechanism of claim 3 and further including means for moving said conveyors at a substantially uniform velocity whereby the upper and lower slats retain their relative positions.

6. The mechanism of claim 3 wherein the slats of one of said conveyors are rectangular in cross-section and have declined front surfaces and inclined rear surfaces.

7. The mechanism of claim 6 wherein the slats of the overlying conveyor are circular in cross-section.

8. The mechanism of claim 7 wherein said conveyors are inclined.

9. A sorting mechanism comprising a first longitudinally movable conveyor having a plurality of transverse slats providing an upper conveying surface, a second longitudinally movable conveyor having a conveying surface closely underlying the conveying surface of said first conveyor and having a plurality of transverse slats cooperating with the slats of said first conveyor to support and convey articles having a size greater than a predetermined size and to permit passage between the slats of said first and second conveyors of articles having a size less than said predetermined size, one of said conveyors including an endless chain of interconnected links and a shaft rotated in timed relation with the movement of the other one of said conveyors, a sprocket rotatably disposed on said shaft in driving engagement with the links of said endless chain, a disc secured to said shaft and disposed adjacent said sprocket, and means for releasably coupling said sprocket with said disc, said coupling means including means for releasably adjusting the relative angular position of said sprocket with respect to said disc.

10. In a conveyor including a conveying member, a tab projecting laterally from said member, a slat having a flattened tubular end with an elongated opening receiving the tab, the tab being narrower than the maximum dimension of the opening measured transversely of the slat so as to be adjustable in the opening transversely of said slat, and means for securing the tab to the slat at a position offset from the longitudinal axis of the slat.

(References on following page)

References Cited by the Examiner

UNITED STATES PATENTS

| | | | |
|---|---|---|---|
| 222,199 | 12/1879 | Nevinger | 209—307 |
| 878,285 | 2/1908 | Heimburger | 171—14 |
| 1,117,311 | 11/1914 | Blair | 198—195 |
| 1,332,305 | 3/1920 | Ross | 209—307 |
| 1,337,257 | 4/1920 | McQuinn | 209—84 |
| 1,487,642 | 3/1924 | Wiseman | 198—195 |
| 1,676,481 | 7/1928 | Crummey | 209—307 |
| 1,715,218 | 5/1929 | Wright | 198—195 |
| 1,758,603 | 5/1930 | Helerbolt | 209—308 |

FOREIGN PATENTS

| | | |
|---|---|---|
| 511,339 | 10/1930 | Germany. |
| 1,111,486 | 7/1961 | Germany. |
| 730,029 | 5/1955 | Great Britain. |
| 855,422 | 11/1960 | Great Britain. |

HARRY B. THORNTON, *Primary Examiner.*

HERBERT L. MARTIN, *Examiner.*

R. HALPER, *Assistant Examiner.*